US011609013B2

(12) United States Patent
Tamura et al.

(10) Patent No.: US 11,609,013 B2
(45) Date of Patent: Mar. 21, 2023

(54) AIR-CONDITIONING CONTROL APPARATUS, AIR-CONDITIONING CONTROL METHOD, AND COMPUTER READABLE MEDIUM

(71) Applicant: Mitsubishi Electric Corporation, Tokyo (JP)

(72) Inventors: Natsumi Tamura, Tokyo (JP); Masanori Hashimoto, Tokyo (JP); Masashi Momota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 246 days.

(21) Appl. No.: 17/000,806

(22) Filed: Aug. 24, 2020

(65) Prior Publication Data

US 2021/0063040 A1    Mar. 4, 2021

(30) Foreign Application Priority Data

Aug. 30, 2019   (JP) .............................. JP2019-158434

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/64* (2018.01); *F24F 11/65* (2018.01); *G05B 19/042* (2013.01); *F24F 2011/0006* (2013.01); *F24F 2110/10* (2018.01); *F24F 2110/12* (2018.01); *G05B 2219/2614* (2013.01)

(58) Field of Classification Search
CPC .. F24F 11/46; F24F 11/64; F24F 11/65; F24F 2011/0006; F24F 2110/10; F24F 2110/12;
(Continued)

(56) References Cited

U.S. PATENT DOCUMENTS

2015/0142179 A1   5/2015   Ito et al.
2020/0080742 A1   3/2020   Okamoto et al.

FOREIGN PATENT DOCUMENTS

CN   106500270 B   2/2019
EP   3 093 568 A1   11/2016
(Continued)

OTHER PUBLICATIONS

Australian Office Action for Australian Application No. 2020223640, dated Sep. 8, 2021.
(Continued)

*Primary Examiner* — Mohammad Ali
*Assistant Examiner* — Sheela Rao
(74) *Attorney, Agent, or Firm* — Birch, Stewart, Kolasch & Birch, LLP

(57) ABSTRACT

An air-conditioning method suitable for reducing energy consumption is selected. A comparison unit 105 compares first operating efficiency, which is operating efficiency when only first air conditioning is performed, with second operating efficiency, which is operating efficiency when only second air conditioning is performed. The first air conditioning is air conditioning in an air-conditioning target space by an air conditioner, and the second air conditioning is air conditioning in the air-conditioning target space by supplying outdoor air without adjusting a temperature of the outdoor air to the air-conditioning target space. A decision unit 106 decides whether to perform the first air conditioning and whether to perform the second air conditioning, based on a result of comparison between the first operating efficiency and the second operating efficiency by the comparison unit 105.

12 Claims, 7 Drawing Sheets

(51) Int. Cl.
*F24F 11/65* (2018.01)
*G05B 19/042* (2006.01)
*F24F 11/00* (2018.01)
*F24F 110/10* (2018.01)
*F24F 110/12* (2018.01)

(58) Field of Classification Search
CPC .. F24F 1/0038; F24F 11/0001; F24F 2110/20; F24F 2110/22; F24F 12/006; F24F 1/0035; F24F 7/00; F24F 11/80; F24F 2120/10; G05B 19/042; G05B 2219/2614; Y02B 30/56
See application file for complete search history.

(56) References Cited

FOREIGN PATENT DOCUMENTS

| | | | |
|---|---|---|---|
| EP | 3093568 A1 * | 11/2016 | ......... F24F 11/0001 |
| JP | 2005-156148 A | 6/2005 | |
| JP | 2015-28391 A | 2/2015 | |
| JP | 2016-3793 A | 1/2016 | |
| KR | 10-1423448 B1 | 7/2014 | |
| WO | WO 2008/127660 A1 | 10/2008 | |
| WO | WO 2015/114722 A1 | 8/2015 | |
| WO | WO 2018/182022 A1 | 10/2018 | |

OTHER PUBLICATIONS

Masui et al., "Study on the outdoor air intake technology to the HVAC system utilizing Package Air-Conditioner and Total Heat Exchanger Part-1 Investigation on energy saving characteristics for applying the Air Ventilation System and the Outdoor Air Cooling", The academic meeting, The Society of Heating Air Conditioning Sanitary Engineers of Japan, Sep. 19, 2019, pp. 1-4.

Seki et al., "Outdoor Air Cooling and Indoor Environment in Super High-rise Buildings", The collection of academic papers, The Society of Heating, Air-Conditioning Sanitary Engineers of Japan, 6-8 Oct. 6-8, 1987, pp. 485-488 (Total No. pp. 5).

* cited by examiner

AIR-CONDITIONING CONTROL APPARATUS, AIR-CONDITIONING CONTROL METHOD, AND COMPUTER READABLE MEDIUM

CROSS-REFERENCE TO RELATED APPLICATIONS

This application is based on and claims the benefit of priority from Japanese Patent Application No. 2019-158434, filed in Japan on Aug. 30, 2019, the content of which is incorporated herein by reference in its entirety.

TECHNICAL FIELD

The present invention relates to an air-conditioning system.

BACKGROUND ART

Expectations are being placed on a zero-energy building (ZEB) in order to realize reduction in the amount of carbon dioxide emissions from commercial buildings. The ZEB is an idea to bring the amount of energy consumption of a building closer to zero by reducing energy consumption and utilizing renewable energy. Attention is being given to outdoor air cooling as a technology for realizing the ZEB.

The outdoor air cooling is a technology that supplies outdoor air without adjusting the temperature of the outdoor air to an air-conditioning target space to air-condition (cool) the air-conditioning target space.

As a technology using the outdoor air cooling, there is a technology described in Patent Literature 1.

CITATION LIST

Patent Literature

[Patent Literature 1] JP 2005-156148 A

SUMMARY OF INVENTION

Technical Problem

In Patent Literature 1, if the temperature of the outdoor air, the humidity of the outdoor air, and the difference between an indoor enthalpy and an outdoor enthalpy satisfy their respective conditions, the outdoor air is supplied to the air-conditioning target space.

In Patent Literature 1, control of the outdoor air cooling and control of normal cooling by an air conditioner are performed independently. For this reason, even in a situation in which the normal cooling using the air conditioner allows less energy consumption than that in the outdoor air cooling, if the conditions for the temperature of the outdoor air, the humidity of the outdoor air, and the difference between the enthalpies are satisfied, the outdoor air cooling is performed instead of the normal cooling using the air conditioner. For example, when the difference between the enthalpies is small, it may be more efficient to operate a heat pump of the air conditioner than to operate a fan of a ventilator used for the outdoor air cooling. In such a case, the normal cooling using the air conditioner allows less energy consumption than that in the outdoor air cooling.

The technology of Patent Literature 1 thus has a problem in that an air-conditioning method suitable for reducing energy consumption cannot be effectively selected.

It is a primary object of the present invention to solve the above-described problem. More specifically, it is a primary object of the present invention to select an air-conditioning method suitable for reducing energy consumption.

Solution to Problem

An air-conditioning control apparatus according to this invention includes:

processing circuitry:

to compare first operating efficiency, which is operating efficiency when only first air conditioning is performed, with second operating efficiency, which is operating efficiency when only second air conditioning is performed, the first air conditioning being air conditioning in an air-conditioning target space by an air conditioner, the second air conditioning being air conditioning in the air-conditioning target space by supplying outdoor air without adjusting a temperature of the outdoor air to the air-conditioning target space; and to decide whether to perform the first air conditioning and whether to perform the second air conditioning, based on a result of comparison between the first operating efficiency and the second operating efficiency.

Advantageous Effects of Invention

According to the present invention, an air-conditioning method suitable for reducing energy consumption can be selected.

DESCRIPTION OF EMBODIMENTS

Embodiments of the present invention will be described hereinafter with reference to the drawings. In the following description of the embodiments and the drawings, portions denoted by the same reference signs indicate the same or corresponding portions.

First Embodiment

*Description of Configuration*

Figure 1:
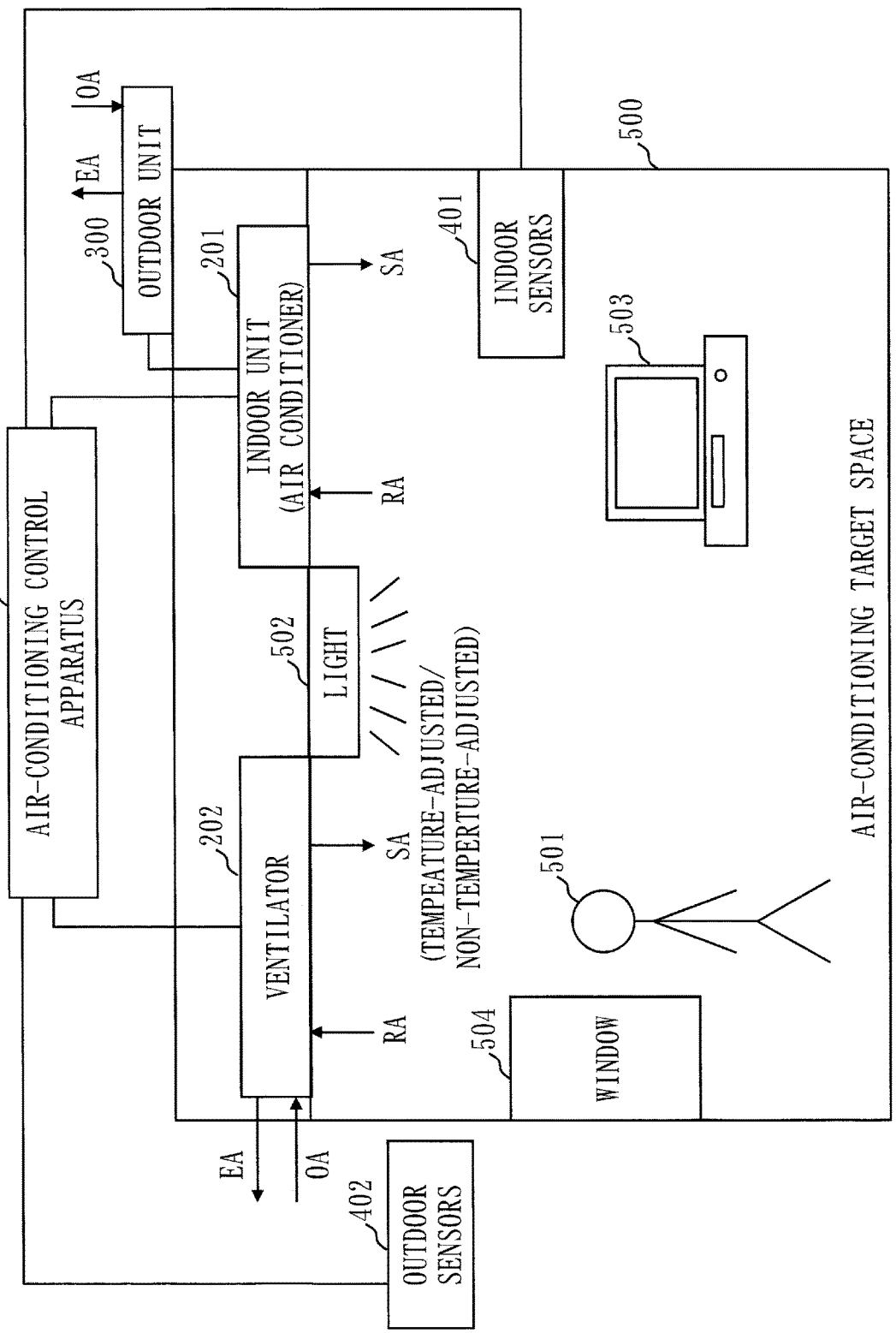
FIG. 1 is a diagram illustrating an example of a configuration of an air-conditioning system according to a first embodiment.

FIG. 1 illustrates an example of a configuration of an air-conditioning system according to this embodiment.

An air-conditioning target space 500 is a space to be air-conditioned. The air-conditioning target space 500 is, for example, an office. In this embodiment, air conditioning by cooling will be described as an example of air conditioning in the air-conditioning target space 500. The air-conditioning target space 500 is air-conditioned by normal cooling by an indoor unit 201 or outdoor air cooling by a ventilator 202. The inside of the air-conditioning target space 500 is also referred to as indoor, and the outside of the air-conditioning target space 500 is also referred to as outdoor.

In the air-conditioning target space 500, there are a user 501, a light 502, and a personal computer (PC) 503 as heat sources, for example. In the air-conditioning target space 500, there is also a window 504.

In the air-conditioning target space 500, there are also indoor sensors 401. The indoor sensors 401 measure the temperature, humidity, and the like in the air-conditioning target space 500.

There are outdoor sensors 402 outdoors. The outdoor sensors 402 measure the outdoor temperature, humidity, and the like.

The indoor unit 201 is placed, for example, behind of the ceiling of the air-conditioning target space 500. The indoor unit 201 is connected with an outdoor unit 300 located outdoors.

The indoor unit 201 is an example of an air conditioner.

The normal cooling by the indoor unit 201 is also referred to as first air conditioning.

In FIG. 1, the ventilator 202 is placed behind the ceiling of the air-conditioning target space 500. However, the ventilator 202 may be placed inside the air-conditioning target space 500. Alternatively, the ventilator 202 may be placed away from the air-conditioning target space 500.

The ventilator 202 is, for example, a total heat exchanger.

Figure 7:
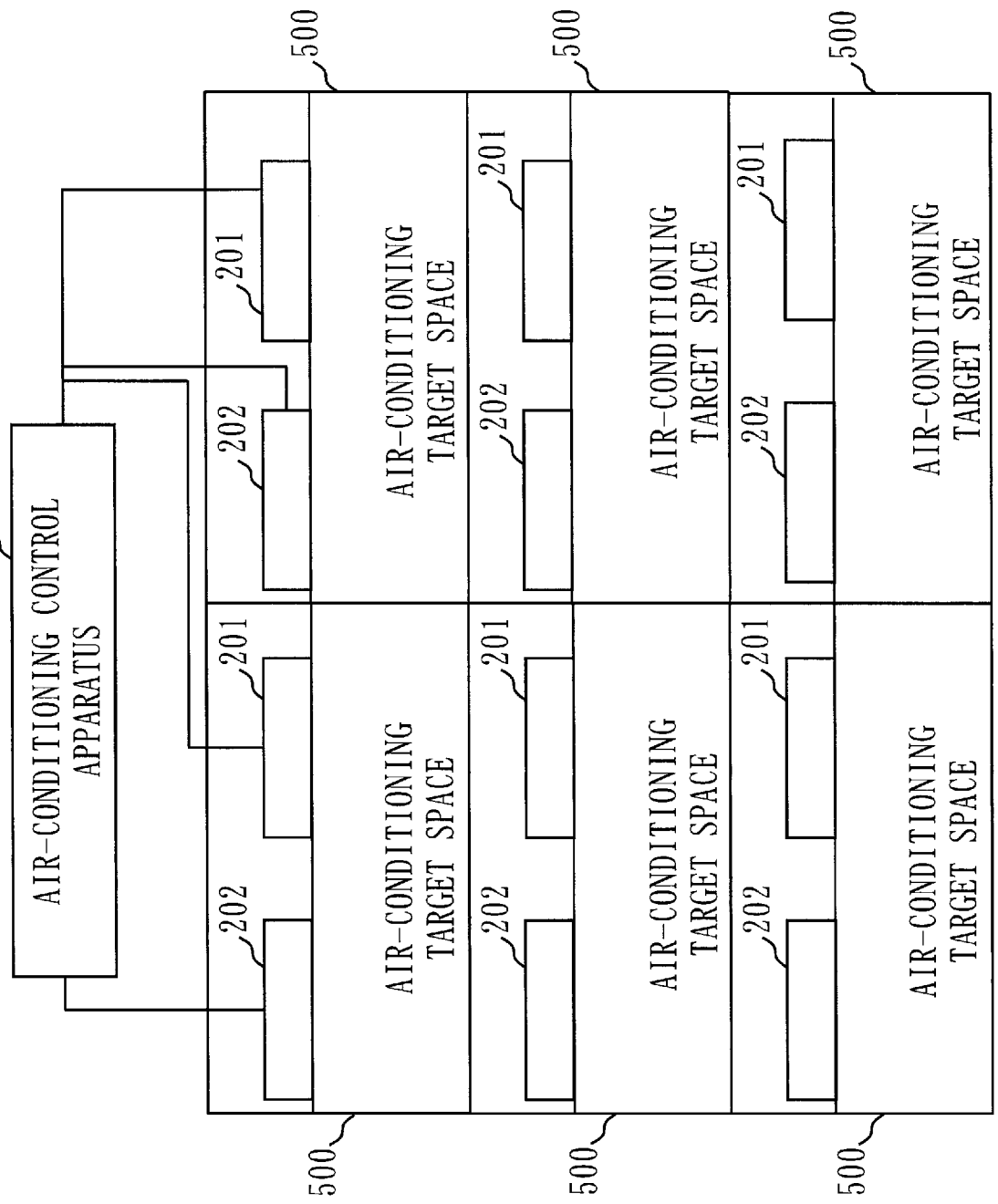
FIG. 7 is a diagram illustrating an example of a configuration of an air-conditioning system in a commercial building according to the first embodiment.

FIG. 7 illustrates an example of a configuration of an air-conditioning system in a commercial building.

FIG. 7 illustrates an example in which the ventilator 202 is a total heat exchanger.

When the ventilator 202 is a total heat exchanger, the ventilator 202 is placed in each air-conditioning target space 500, as illustrated in FIG. 7.

In FIG. 7, for simplicity of the diagram, illustration of elements other than an air-conditioning control apparatus 100, the indoor units 201, and the ventilators 202 is omitted. In FIG. 7, illustration of lines that connect the air-conditioning control apparatus 100 with each of the indoor units 201 and the ventilators 202 is omitted except for some lines.

The description will continue below using the configuration of FIG. 1.

The ventilator 202 supports a method of supplying outdoor air after adjusting the temperature of the outdoor air to the air-conditioning target space 500 and a method of supplying the outdoor air without adjusting the temperature of the outdoor air to the air-conditioning target space 500. The latter method corresponds to the outdoor air cooling. The outdoor air cooling by the ventilator 202 is also referred to as second air conditioning.

In FIG. 1, SA is supply air, that is, the air supplied from the indoor unit 201 or the ventilator 202 to the air-conditioning target space 500. RA is return air, that is, the air returned from the air-conditioning target space 500 to the indoor unit 201 or the ventilator 202. OA is outdoor air, that is, the air supplied from the outside to the outdoor unit 300 or the ventilator 202. EA is exhaust air, that is, the air discharged from the outdoor unit 300 or the ventilator 202 to the outside.

As illustrated in FIG. 1, either the SA obtained by adjusting the temperature of the OA or the SA obtained without adjusting the temperature of the OA is supplied from the ventilator 202. The SA obtained by adjusting the temperature of the OA will hereinafter be referred to also as temperature-adjusted SA. The SA obtained without adjusting the temperature of the OA will be referred to also as non-temperature-adjusted SA.

The indoor unit 201 and the ventilator 202 are connected to the air-conditioning control apparatus 100. The air-conditioning control apparatus 100 is connected to the indoor sensors 401 and the outdoor sensors 402. The air-conditioning control apparatus 100 acquires measurement values of the temperature and the like in the air-conditioning target space 500 from the indoor sensors 401. The air-conditioning control apparatus 100 also acquires measurement values of the outdoor temperature and the like from the outdoor sensors 402.

The air-conditioning control apparatus 100 uses the values acquired from the indoor sensors 401 and the outdoor sensors 402 to calculate operating efficiency when only the first air conditioning by the indoor unit 201 (normal cooling) is performed (hereinafter referred to as first operating efficiency) and operating efficiency when only the second air conditioning by the ventilator 202 (outdoor air cooling) is performed (hereinafter referred to as second operating efficiency). Then, the air-conditioning control apparatus 100 compares the first operating efficiency with the second operating efficiency, and selects a cooling method with higher operating efficiency. As a result, the air-conditioning control apparatus 100 can select a cooling method with lower energy consumption. In this embodiment, it is assumed that the air-conditioning control apparatus 100 calculates coefficients of performance (COPs) as the first operating efficiency and the second operating efficiency.

The operating procedure of the air-conditioning control apparatus 100 corresponds to an air-conditioning control method. A program for realizing the operation of the air-conditioning control apparatus 100 corresponds to an air-conditioning control program.

The indoor sensors 401 include a temperature sensor, a humidity sensor, an infrared sensor, and a sensor that can detect the number of persons. The temperature sensor measures the air temperature in the air-conditioning target space 500. The humidity sensor measures the humidity in the air-conditioning target space 500. The infrared sensor detects the number of heat sources in the air-conditioning target space 500. The sensor that can detect the number of persons detects the number of persons present in the air-conditioning target space 500.

The outdoor sensors 402 include a temperature sensor and a humidity sensor. The temperature sensor measures the outdoor air temperature. The humidity sensor measures the outdoor humidity.

Figure 2:
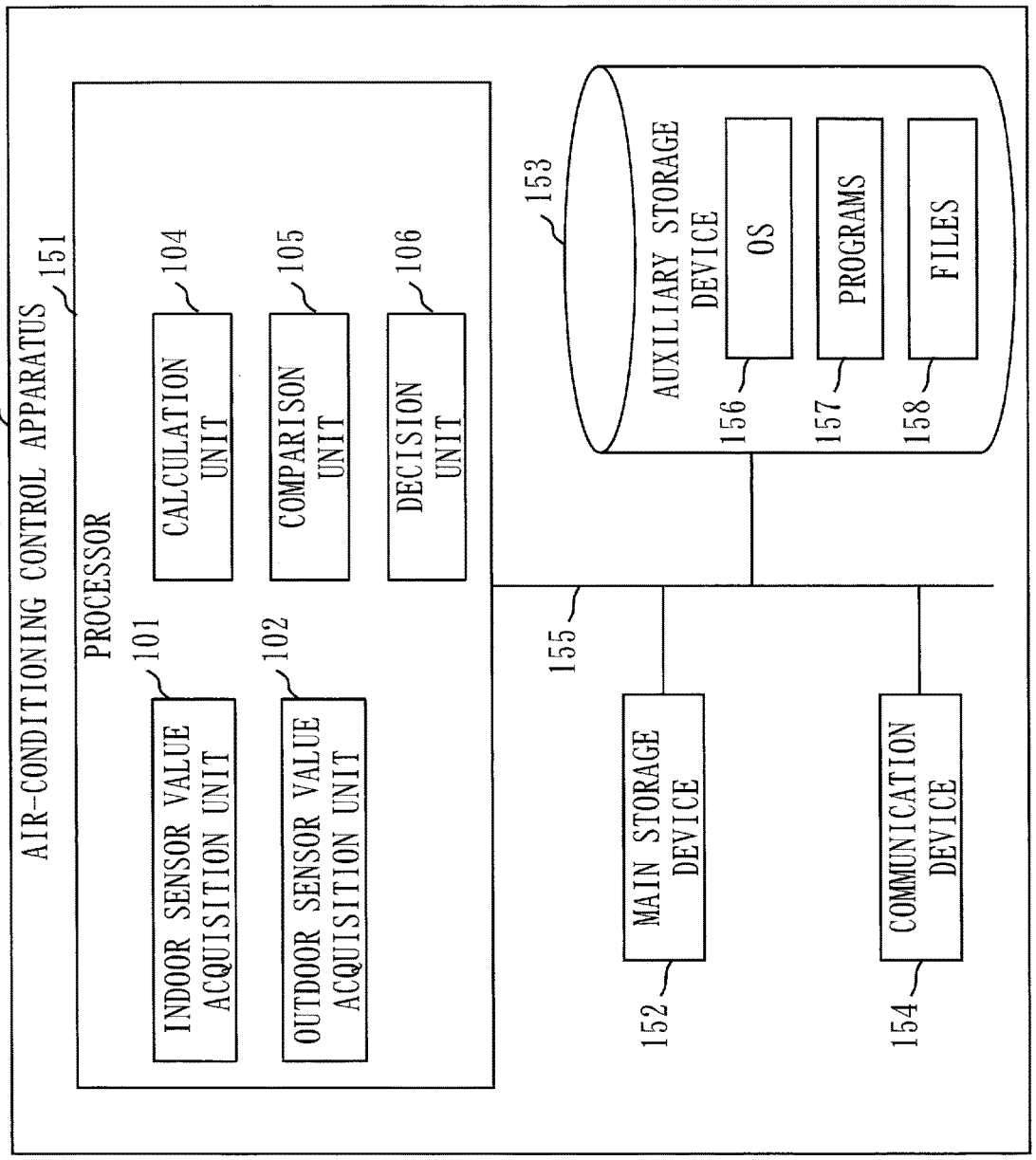
FIG. 2 is a diagram illustrating an example of a hardware configuration of an air-conditioning control apparatus according to the first embodiment.

FIG. 2 illustrates an example of a hardware configuration of the air-conditioning control apparatus 100 according to this embodiment.

The air-conditioning control apparatus 100 includes, as hardware, a processor 151, a main storage device 152, an auxiliary storage device 153, a communication device 154, and a bus 155. The processor 151, the main storage device 152, the auxiliary storage device 153, and the communication device 154 are connected to the bus 155.

The auxiliary storage device 153 stores an operating system (OS) 156, programs 157, and files 158.

The programs 157 are programs for realizing the functions of an indoor sensor value acquisition unit 101, an outdoor sensor value acquisition unit 102, a calculation unit 104, a comparison unit 105, and a decision unit 106 to be described later.

The programs 157 are loaded from the auxiliary storage device 153 into the main storage device 152. Then, the processor 151 executes the programs 157 to operate the indoor sensor value acquisition unit 101, the outdoor sensor value acquisition unit 102, the calculation unit 104, the comparison unit 105, and the decision unit 106.

FIG. 2 schematically represents a state in which the processor 151 is executing the programs 157, that is, a state in which the processor 151 is operating as the indoor sensor value acquisition unit 101, the outdoor sensor value acquisition unit 102, the calculation unit 104, the comparison unit 105, and the decision unit 106.

The communication device 154 is used for communication with the indoor unit 201, the ventilator 202, the indoor sensors 401, and the outdoor sensors 402.

Figure 3:
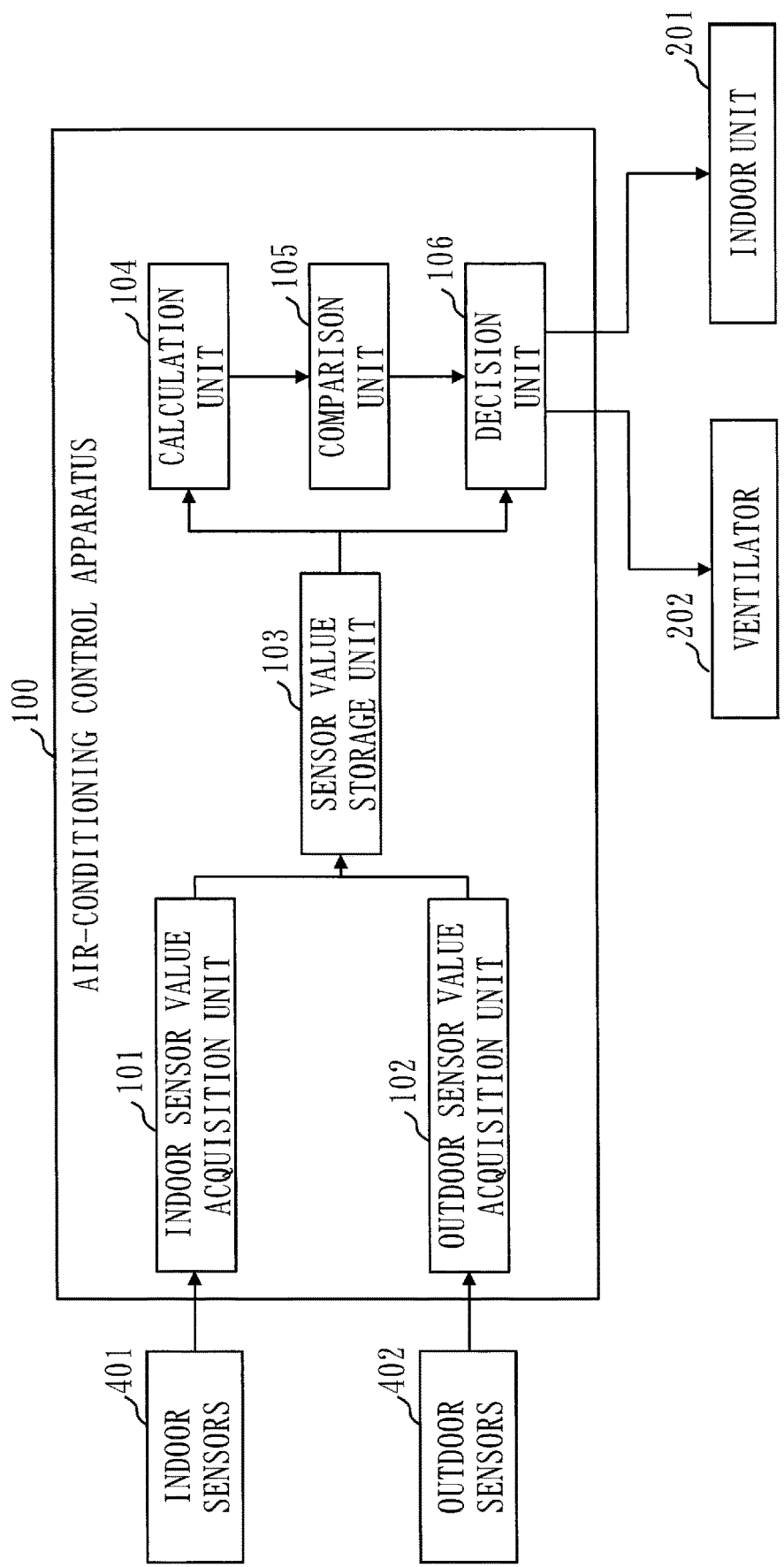
FIG. 3 is a diagram illustrating an example of a functional configuration of the air-conditioning control apparatus according to the first embodiment.

FIG. 3 illustrates an example of a functional configuration of the air-conditioning control apparatus 100 according to this embodiment.

The indoor sensor value acquisition unit 101 acquires measurement values of the indoor sensors 401 on the temperature, humidity, and the like from the indoor sensors 401 via the communication device 154. The indoor sensor value acquisition unit 101 stores the acquired measurement values in a sensor value storage unit 103. The measurement values of the indoor sensors 401 will hereinafter be referred to also as indoor sensor values.

The outdoor sensor value acquisition unit 102 acquires measurement values of the outdoor sensors 402 on the temperature, humidity, and the like from the outdoor sensors 402 via the communication device 154. The outdoor sensor value acquisition unit 102 stores the acquired measurement values in the sensor value storage unit 103. The measurement values of the outdoor sensors 402 will hereinafter be referred to also as outdoor sensor values.

The sensor value storage unit 103 stores the indoor sensor values acquired by the indoor sensor value acquisition unit 101 and the outdoor sensor values acquired by the outdoor sensor value acquisition unit 102.

The sensor value storage unit 103 is realized by the main storage device 152 or the auxiliary storage device 153 illustrated in FIG. 2.

The calculation unit 104 reads the indoor sensor values and the outdoor sensor values from the sensor value storage unit 103. Then, the calculation unit 104 uses the indoor sensor values and the outdoor sensor values to calculate the first operating efficiency and the second operating efficiency.

As described above, the first operating efficiency is the operating efficiency when only the first air conditioning by the indoor unit 201 (normal cooling) is performed. The second operating efficiency is the operating efficiency when only the second air conditioning by the ventilator 202 (outdoor air cooling) is performed.

The calculation unit 104 notifies the comparison unit 105 of the first operating efficiency and the second operating efficiency that have been calculated.

The comparison unit 105 performs comparison between the first operating efficiency and the second operating efficiency calculated by the calculation unit 104. The comparison unit 105 notifies the decision unit 106 of a result of the comparison.

The process performed by the comparison unit 105 corresponds to a comparison process.

The decision unit 106 decides whether to perform the first air conditioning (normal cooling by the indoor unit 201) and whether to perform the second air conditioning (outdoor air cooling by the ventilator 202), based on the result of the comparison by the comparison unit 105.

More specifically, the decision unit 106 determines whether conditions for performing the second air conditioning are met. The conditions for performing the second air conditioning are that the specific enthalpy of the indoor air is greater than the specific enthalpy of the outdoor air, and that outdoor air parameters satisfy specified conditions. Then, if the conditions for performing the second air conditioning are met and the first operating efficiency is less than the second operating efficiency, the decision unit 106 decides to perform the second air conditioning instead of performing the first air conditioning. If the first operating efficiency is greater than or equal to the second operating efficiency, the decision unit 106 decides to perform the first air conditioning instead of performing the second air conditioning. In this case, the decision unit 106 decides to supply the outdoor air without adjusting the temperature of the outdoor air to the air-conditioning target space 500 to ventilate the air-conditioning target space 500. That is, the decision unit 106 decides to supply the non-temperature-adjusted SA to the air-conditioning target space 500. The difference between the second air conditioning (outdoor air cooling) and the ventilation using the non-temperature-adjusted SA is the amount of supply air. In the second air conditioning (outdoor air cooling), the outdoor air is directly supplied to the air-conditioning target space 500 in an amount of air that can achieve a set temperature of the air-conditioning target space 500. In the ventilation using the non-temperature-adjusted SA, the outdoor air is directly supplied to the air-conditioning target space 500 only in an amount of required ventilation. The amount of required ventilation is an amount of minimum ventilation corresponding to the number of persons present in the air-conditioning target space 500. To maximize the effect, it is desirable to perform such control on the amount of the outdoor air to be introduced. Ventilation exceeding the amount of required ventilation may also be performed. If the set temperature of the air-conditioning target space 500 cannot be achieved by the second air conditioning, control for cooling also by the indoor unit 201 may be added.

If the conditions for performing the second air conditioning are not met, the decision unit 106 decides to perform the first air conditioning instead of performing the second air conditioning, and the decision unit 106 further decides to adjust the temperature of the outdoor air, to supply the outdoor air to the air-conditioning target space 500, and to ventilate the air-conditioning target space 500. If the conditions for performing the second air conditioning are not met, it is not desirable to directly supply the outdoor air to the air-conditioning target space 500. In this case, the temperature of the outdoor air is adjusted to be close to the room temperature in the total heat exchanger, and then the ventilation by the outdoor air is performed. At this time, only the amount of required ventilation is supplied to the air-conditioning target space 500. The amount of required ventilation is the amount of minimum ventilation corresponding to the number of persons present in the air-conditioning target space 500. To maximize the effect, it is desirable to perform such control on the amount of the outdoor air to be introduced. Ventilation exceeding the amount of required ventilation may also be performed.

The decision unit 106 controls the indoor unit 201 or the ventilator 202 via the communication device 154 in accordance with its decision. For example, in a state in which the indoor unit 201 is stopped and the ventilator 202 is operating, if it is decided to perform the first air conditioning instead of performing the second air conditioning, the decision unit 106 causes the indoor unit 201 to start operating.

The process performed by the decision unit 106 corresponds to a decision process.

*Description of Operation*

Figure 4:
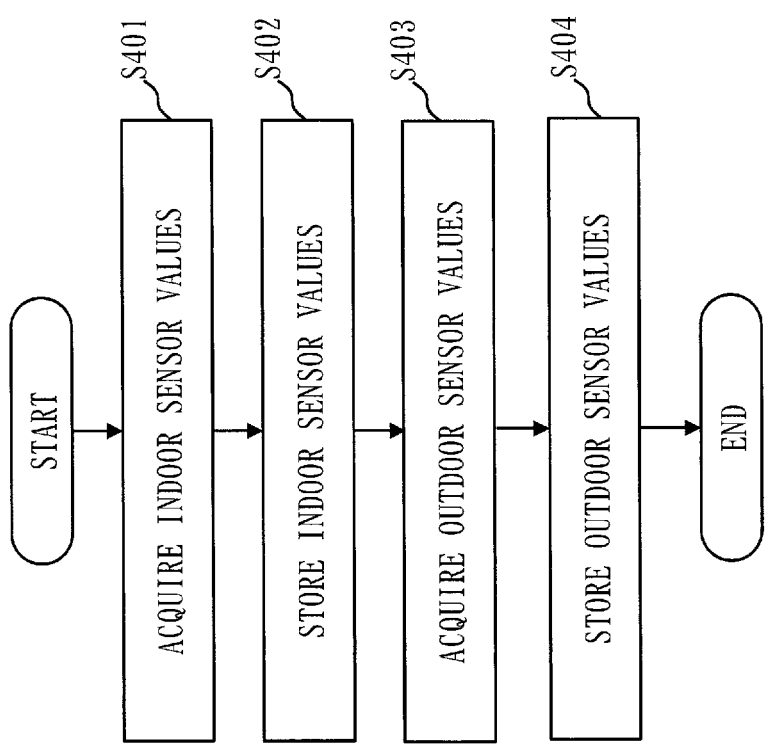
FIG. 4 is a flowchart illustrating an example of operation of the air-conditioning control apparatus according to the first embodiment.
Figure 5:
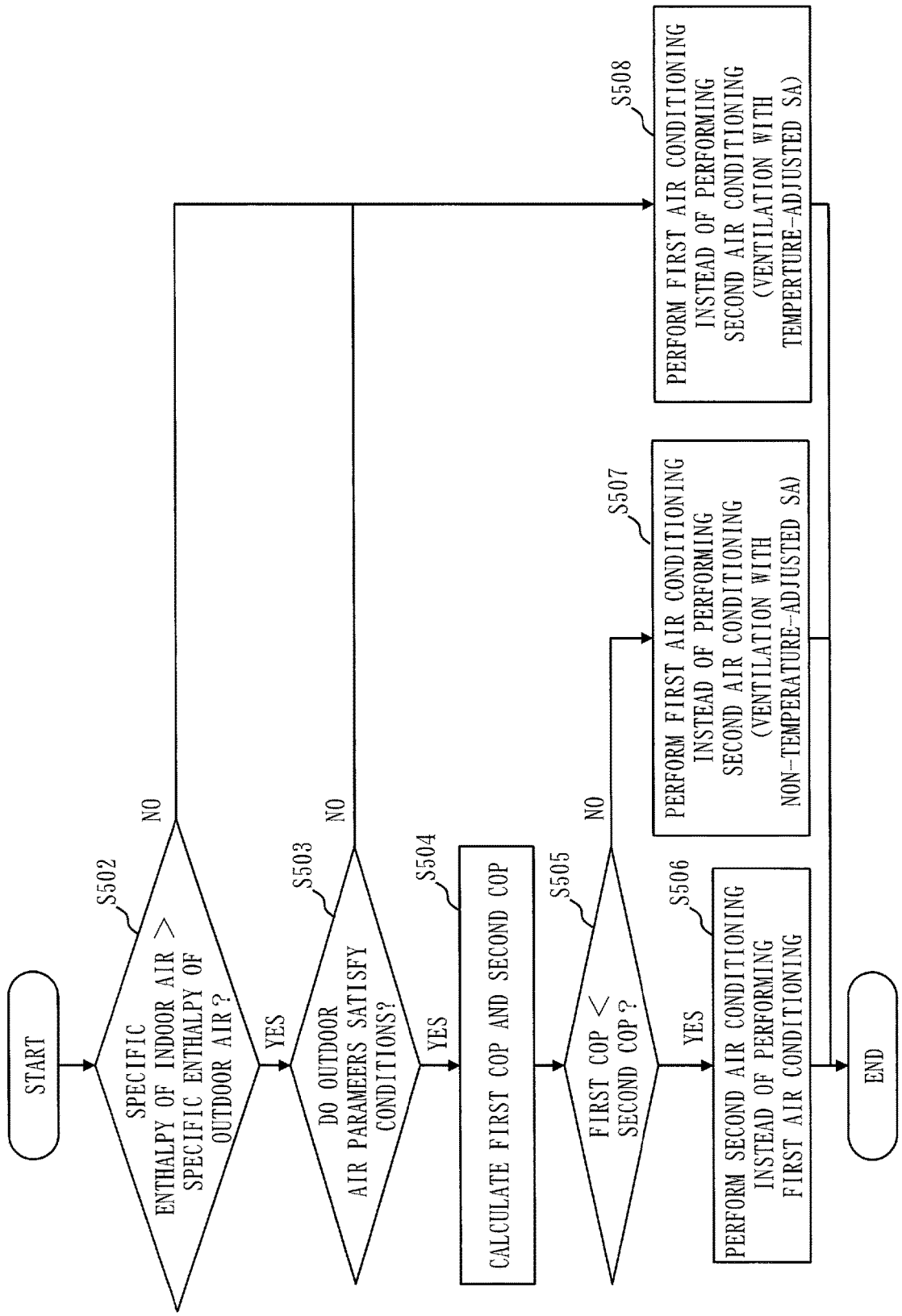
FIG. 5 is a flowchart illustrating an example of operation of the air-conditioning control apparatus according to the first embodiment.

FIGS. 4 and 5 are flowcharts illustrating an example of the operation of the air-conditioning control apparatus 100 according to this embodiment.

FIG. 4 illustrates a procedure for acquiring indoor sensor values and outdoor sensor values. The procedure of FIG. 4 is repeatedly performed at regular intervals.

In step S401, the indoor sensor value acquisition unit 101 acquires indoor sensor values from the indoor sensors 401.

In step S402, the indoor sensor value acquisition unit 101 stores the acquired indoor sensor values in the sensor value storage unit 103.

In step S403, the outdoor sensor value acquisition unit 102 acquires outdoor sensor values from the outdoor sensors 402.

In step S404, the outdoor sensor value acquisition unit 102 stores the acquired outdoor sensor values in the sensor value storage unit 103.

FIG. 4 illustrates an example in which indoor sensor values are acquired before outdoor sensor values. However, outdoor sensor values may be acquired before indoor sensor values. Alternatively, indoor sensor values and outdoor sensor values may be acquired in parallel.

It may also be arranged that only indoor sensor values are acquired in one cycle, and only outdoor sensor values are acquired in another cycle.

FIG. 5 illustrates a procedure for selecting a cooling method. The procedure of FIG. 5 is repeatedly performed at regular intervals.

Steps S502 to S503 are a process to determine whether the indoor and outdoor environments are suitable for the second air conditioning (outdoor air cooling). Step S505 is a process to determine which of the first air conditioning (normal cooling) and the second air conditioning (outdoor air cooling) allows less energy consumption when the indoor and outdoor environments are suitable for the second air conditioning (outdoor air cooling).

In step S502, the decision unit 106 determines whether the specific enthalpy of the indoor air is greater than the specific enthalpy of the outdoor air.

The specific enthalpy is a difference from the enthalpy per unit mass of air at 0° C.

The decision unit 106 calculates the specific enthalpy of the indoor air (inside the room). The decision unit 106 also calculates the specific enthalpy of the outdoor air (outside the room).

Then, the decision unit 106 performs comparison between the specific enthalpy of the indoor air and the specific enthalpy of the outdoor air that have been calculated.

If the specific enthalpy of the indoor air is greater than the specific enthalpy of the outdoor air (YES in step S502), the process proceeds to step S503. If the specific enthalpy of the indoor air is not greater than the specific enthalpy of the outdoor air (NO in step S502), the process proceeds to step S508.

In step S503, the decision unit 106 determines whether the outdoor air parameters satisfy the conditions.

The outdoor air parameters are, for example, as follows:
the temperature of the outdoor air,
the absolute humidity of the outdoor air, and
the specific enthalpy of the outdoor air.

The conditions for the outdoor air parameters are, for example, as follows:
within the range between the upper limit value and the lower limit value of the temperature of the outdoor air,
within the range between the upper limit value and the lower limit value of the absolute humidity of the outdoor air, and
within the range of the upper limit value and the lower limit value of the specific enthalpy of the outdoor air.

If the current outdoor air parameters satisfy the conditions (YES in step S503), the process proceeds to step S504. If the current outdoor air parameters do not satisfy the conditions (NO in step S503), the process proceeds to step S508.

In step S504, the decision unit 106 requests the calculation unit 104 to calculate the operating efficiency, and the calculation unit 104 calculates the first operating efficiency and the second operating efficiency.

As described above, the calculation unit 104 calculates COPs as the first operating efficiency and the second operating efficiency.

The calculation unit 104 first calculates a processed heat load. The processed heat load is the heat load (W) to be processed in cooling. The processed heat load is calculated by a general calculation method using the temperature of the outdoor air, the humidity of the outdoor air, the number of persons in the room, the number of heat sources in the room, and the like.

The calculation unit 104 also calculates power consumption in the normal cooling. The calculation unit 104 further calculates power consumption in the outdoor air cooling. It is assumed that the power consumption is calculated by a general calculation method.

Then, the calculation unit 104 obtains a COP corresponding to the first operating efficiency (hereinafter referred to as a first COP) as indicated below. The calculation unit 104 also obtains a COP corresponding to the second operating efficiency (hereinafter referred to as a second COP) as indicated below.

First COP=processed heat load/power consumption in the normal cooling

Second COP=processed heat load/power consumption in the outdoor air cooling

Then, the calculation unit 104 notifies the comparison unit 105 of the first COP and the second COP.

In step S505, the comparison unit 105 performs comparison between the first COP and the second COP that have been notified from the calculation unit 104, and notifies the decision unit 106 of a result of the comparison.

The process proceeds to step S506 or step S507 depending on the result of the comparison.

If the first COP is less than the second COP (YES in step S505), the decision unit 106 decides to perform the second air conditioning (outdoor air cooling) instead of performing the first air conditioning (normal cooling).

That is, the decision unit 106 decides to perform the outdoor air cooling by the ventilator 202 instead of performing the normal cooling by the indoor unit 201.

When the outdoor air cooling by the ventilator 202 is being performed and the normal cooling by the indoor unit 201 is not being performed currently, the decision unit 106 does not perform control on the indoor unit 201 and the ventilator 202. That is, the decision unit 106 lets the ventilator 202 continue the outdoor air cooling and lets the indoor unit 201 remain in a non-operating state.

When the normal cooling by the indoor unit 201 is being performed and the outdoor air cooling by the ventilator 202 is not being performed currently, the decision unit 106 performs control to cause the indoor unit 201 to stop the normal cooling and cause the ventilator 202 to start the outdoor air cooling. If the set temperature of the air-conditioning target space 500 cannot be achieved with the second air conditioning, control for cooling also by the indoor unit 201 may be added.

If the first COP is greater than or equal to the second COP (NO in step S505), the decision unit 106 decides to perform the first air conditioning (normal cooling) instead of performing the second air conditioning (outdoor air cooling). In this case, the decision unit 106 decides to perform ventilation with the non-temperature-adjusted SA. In this case, since the conditions for performing the second air conditioning are met, the outdoor air can be directly used for ventilation without adjusting the temperature of the outdoor air.

If NO is determined in either step S502 or step S503, the decision unit 106 decides to perform the first air conditioning (normal cooling) instead of performing the second air conditioning (outdoor air cooling) in step S508. In this case, the decision unit 106 decides to perform ventilation with the temperature-adjusted SA. In this case, since the conditions for performing the second air conditioning are not met, it is desirable to adjust the temperature of the outdoor air and then use the temperature-adjusted outdoor air for ventilation.

\*\*\*Description of Effects of this Embodiment\*\*\*

As described above, in this embodiment, the operating efficiency of the first air conditioning (normal cooling) (the first operating efficiency) is compared with the operating efficiency of the second air conditioning (outdoor air cooling) (the second operating efficiency), and an air-conditioning method with higher operating efficiency is selected.

According to this embodiment, therefore, an air-conditioning method suitable for reducing energy consumption can be selected.

In this embodiment, when the second air conditioning (outdoor air cooling) is not performed (step S507 of FIG. 5), the amount of ventilation is adjusted (only the amount of required ventilation is supplied), so that the processed heat load can be reduced and energy consumption can be reduced.

In the above description, the calculation unit 104 calculates the processed heat load using the predetermined formula. Alternatively, the calculation unit 104 may obtain a process heat load value by referring to a table from which the same processed heat load value as that obtained by calculation by the formula can be obtained. This table contains, for example, processed heat load values corresponding to different combinations of the temperature of the outdoor air, the humidity of the outdoor air, the number of persons in the room, the number of heat sources in the room, and the like. The calculation unit 104 extracts, from this table, a processed heat load value corresponding to a combination of the temperature of the outdoor air, the humidity of the outdoor air, the number of persons in the room, the number of heat sources in the room, and the like. This table is set in advance by an administrator of the air-conditioning control apparatus 100, for example.

Second Embodiment

As described in the first embodiment, the processed heat load to be the basis for calculating COPs is calculated using the parameters such as the temperature, the humidity, the number of persons in the room, the number of heat sources in the room, and the like. For this reason, the calculation of the processed heat load is complicated and requires a large amount of calculation resources.

In this embodiment, a configuration that reduces the calculation load will be described. More specifically, in this embodiment, a configuration that obtains an approximate processed heat load based on the temperature of the outdoor air, which has the greatest influence on the processed heat load, will be described.

In this embodiment, differences from the first embodiment will be mainly described.

Aspects not described in the following are substantially the same as those in the first embodiment.

Figure 6:
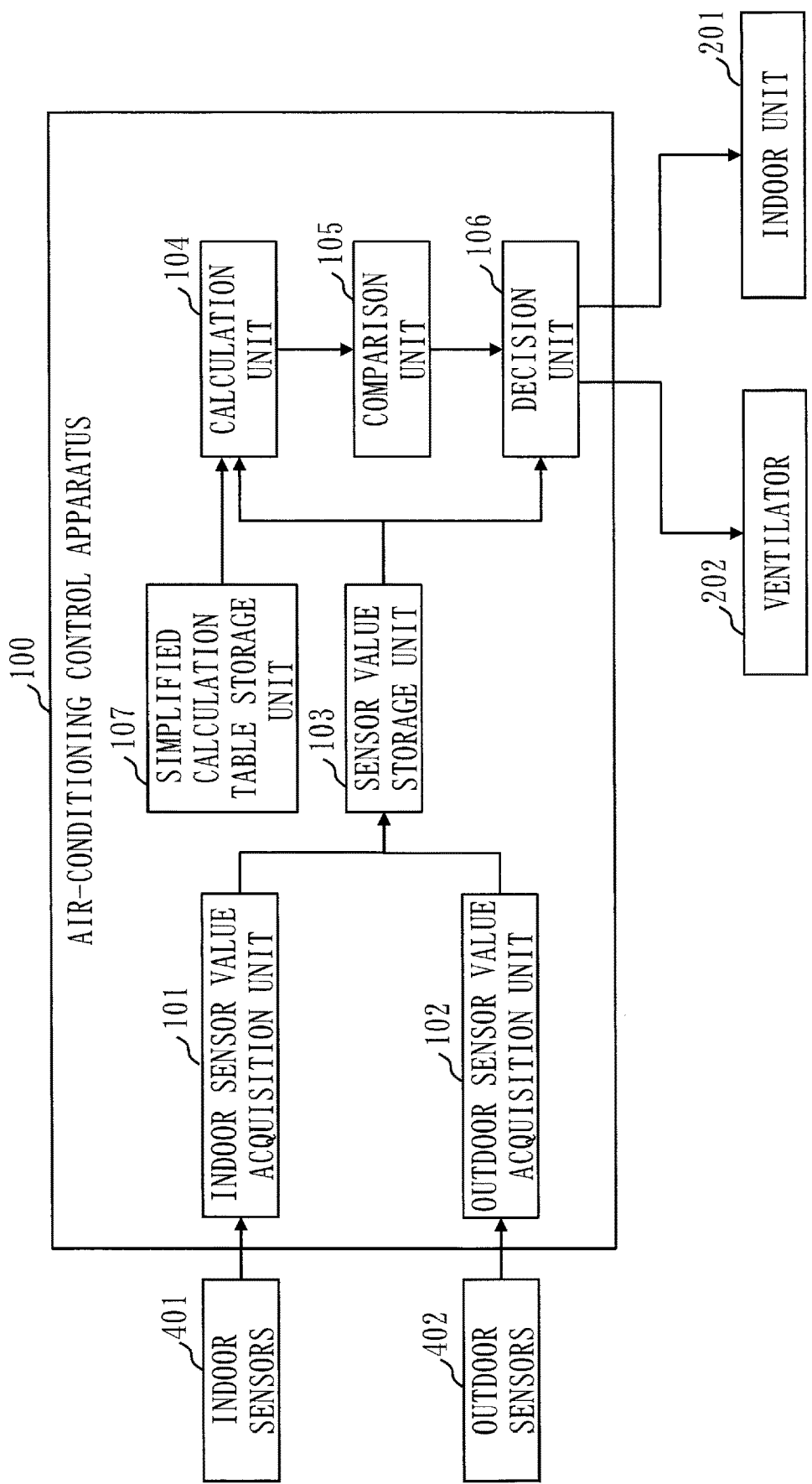
FIG. 6 is a diagram illustrating an example of a functional configuration of an air-conditioning control apparatus according to a second embodiment.

FIG. 6 illustrates an example of a functional configuration of the air-conditioning control apparatus 100 according to this embodiment.

Compared with FIG. 3, a simplified calculation table storage unit 107 is added in FIG. 6. The simplified calculation table storage unit 107 stores a simplified calculation table. The simplified calculation table storage unit 107 is realized by the main storage device 152 or the auxiliary storage device 153.

The simplified calculation table is a table for obtaining the approximate processed heat load based on the temperature of the outdoor air. The simplified calculation table is set in advance by the administrator of the air-conditioning control apparatus 100, for example.

The simplified calculation table indicates a plurality of temperatures of the outdoor air, and indicates a corresponding processed heat load for each of the temperatures of the outdoor air. The processed heat loads indicted in the simplified calculation table can be obtained, for example, by the following formula created by regressing measured temperature values.

$$\text{Processed heat load} = \alpha \times \text{temperature of the outdoor air} + \beta$$

Note that $\alpha$ and $\beta$ are coefficients.

In this embodiment, the calculation unit 104 acquires the temperature of the outdoor air among outdoor sensor values from the sensor value storage unit 103, and extracts a processed heat load corresponding to the acquired temperature of the outdoor air from the simplified calculation table.

Then, the calculation unit 104 divides the processed heat load extracted from the simplified calculation table by the power consumption in the normal cooling so as to obtain the first COP. The calculation unit 104 also divides the processed heat load extracted from the simplified calculation table by the power consumption in the outdoor air cooling so as to obtain the second COP.

As described above, in this embodiment the processed heat load is obtained using only the temperature of the outdoor air, so that the calculation load of COP calculation can be reduced.

In this embodiment, an example in which the processed heat load is obtained using the simplified calculation table has been described. However, the calculation unit 104 may be adapted to calculate the processed heat load using the above formula "processed heat load=α×temperature of the outdoor air+β".

In the first and second embodiments, examples in which cooling is performed as air conditioning in the air-conditioning target space 500 have been described.

The first and second embodiments can also be adapted to a case in which heating is performed in the air-conditioning target space 500 by interpreting "cooling" as "heating" and interpreting "low temperature" as "high temperature".

The embodiments of the present invention have been described above. These two embodiments may be implemented in combination.

Alternatively, one of these two embodiments may be partially implemented.

Alternatively, these two embodiments may be partially implemented in combination.

The present invention is not limited to these embodiments, and various modifications are possible as needed.

\*\*\*Description of Hardware Configuration\*\*\*

Lastly, a supplementary description of the hardware configuration of the air-conditioning control apparatus 100 will be provided.

The processor 151 illustrated in FIG. 2 is an integrated circuit (IC) that performs processing.

The processor 151 is a central processing unit (CPU), a digital signal processor (DSP), or the like.

The main storage device 152 illustrated in FIG. 2 is a random access memory (RAM).

The auxiliary storage device 153 illustrated in FIG. 2 is a read-only memory (ROM), a flash memory, a hard disk drive (HDD), or the like.

The communication device 154 illustrated in FIG. 2 is an electronic circuit that performs data communication processing.

The communication device 154 is, for example, a communication chip or a network interface card (NIC).

The processor 151 executes at least part of the OS 156.

The processor 151 executes the programs for realizing the functions of the indoor sensor value acquisition unit 101, the outdoor sensor value acquisition unit 102, the calculation unit 104, the comparison unit 105, and the decision unit 106 while executing at least part of the OS 156.

The execution of the OS 156 by the processor 151 causes task management, memory management, file management, communication control, and the like to be performed.

At least one of information, data, signal values, and variable values that indicate results of processing by the indoor sensor value acquisition unit 101, the outdoor sensor value acquisition unit 102, the calculation unit 104, the comparison unit 105, and the decision unit 106 is stored in at least one of the main storage device 152, the files 158 in the auxiliary storage device 153, and a register or a cache memory in the processor 151.

The programs 157 may be stored in a portable recording medium, such as a magnetic disk, a flexible disk, an optical disc, a compact disc, a Blu-ray (registered trademark) disc, or a DVD. Then, the portable recording medium in which the programs 157 are stored may be distributed.

The "unit" of each of the indoor sensor value acquisition unit 101, the outdoor sensor value acquisition unit 102, the calculation unit 104, the comparison unit 105, and the decision unit 106 may be interpreted as a "circuit", "step", "procedure", or "process".

The air-conditioning control apparatus 100 may be realized by a processing circuit. The processing circuit is, for example, a logic integrated circuit (IC), a gate array (GA), an application specific integrated circuit (ASIC), or a field-programmable gate array (FPGA).

In this case, each of the indoor sensor value acquisition unit 101, the outdoor sensor value acquisition unit 102, the calculation unit 104, the comparison unit 105, and the decision unit 106 is realized as part of the processing circuit.

In this specification, a superordinate concept of the processor and the processing circuitry is referred to as "processing circuitry".

That is, each of the processor and the processing circuit is a specific example of the "processing circuitry".

REFERENCE SIGNS LIST

100: air-conditioning control apparatus, 101: indoor sensor value acquisition unit, 102: outdoor sensor value acquisition unit, 103: sensor value storage unit, 104: calculation unit, 105: comparison unit, 106: decision unit, 107: simplified calculation table storage unit, 151: processor, 152: main storage device, 153: auxiliary storage device, 154: communication device, 155: bus, 156: OS, 157: programs, 158: files, 201: indoor unit, 202: ventilator, 300: outdoor unit, 401: indoor sensors, 402: outdoor sensors, 500: air-conditioning target space, 501: user, 502: light, 503: PC, 504: window

The invention claimed is:

1. An air-conditioning control apparatus comprising:
   a processor; and
   a memory storing computer instructions which, when executed, causes the processor to perform a process including,
   comparing a first operating efficiency, which is an operating efficiency when only first air conditioning is performed, with a second operating efficiency, which is an operating efficiency when only second air conditioning is performed,
      wherein the first air conditioning is air conditioning that cools an air-conditioning target space to a set temperature by operation of an indoor unit of an air conditioner; and
      wherein the second air conditioning is air conditioning that cools the air-conditioning target space to the set temperature, without operating the indoor unit, by operating a ventilator to supply outdoor air into the air-conditioning target space without adjusting a temperature of the supplied outdoor air, the non-temperature-adjusted outdoor air being supplied in sufficient quantity to cool the air-conditioning target space to the set temperature,
   deciding whether to perform the first air conditioning and whether to perform the second air conditioning, based on a result of comparison between the first operating efficiency and the second operating efficiency, and
   controlling the indoor unit and the ventilator to cause one of the first air conditioning and the second air conditioning to be performed based on the decision.

2. The air-conditioning control apparatus according to claim 1,
   wherein when the first operating efficiency is less than the second operating efficiency, the process decides to perform the second air conditioning instead of performing the first air conditioning.

3. The air-conditioning control apparatus according to claim 1,
   wherein when the first operating efficiency is greater than or equal to the second operating efficiency, the process decides to perform the first air conditioning instead of performing the second air conditioning.

4. The air-conditioning control apparatus according to claim 3,
   wherein when the first operating efficiency is greater than or equal to the second operating efficiency, the process decides to ventilate the air-conditioning target space by controlling the ventilator to supply the outdoor air to the air-conditioning target space without adjusting the temperature of the outdoor air to the air.

5. The air-conditioning control apparatus according to claim 4,
wherein the process decides to ventilate the air-conditioning target space with an amount of ventilation corresponding to the number of persons present in the air-conditioning target space.

6. The air-conditioning control apparatus according to claim 1,
wherein the process compares the first operating efficiency with second operating efficiency which is operating efficiency when only the second air conditioning is performed by a total heat exchanger.

7. The air-conditioning control apparatus according to claim 1,
wherein the process calculates the first operating efficiency and the second operating efficiency, and
performs comparison between the first operating efficiency and the second operating efficiency calculated.

8. The air-conditioning control apparatus according to claim 7,
wherein the process obtains a processed heat load, using a table and a formula that allow the processed heat load to be obtained based on a temperature of the outdoor air, and calculates the first operating efficiency and the second operating efficiency, using the obtained processed heat load.

9. The air-conditioning control apparatus according to claim 1,
wherein the process determines whether a condition for performing the second air conditioning is met, and
when the condition for performing the second air conditioning is not met, decides to perform the first air conditioning instead of performing the second air conditioning, and further decides to ventilate the air-conditioning space by controlling the ventilator to supply the outdoor air to the air-conditioning target space after adjusting the temperature of the outdoor air.

10. The air-conditioning control apparatus according to claim 9, wherein
the process decides to ventilate the air-conditioning target space with an amount of ventilation corresponding to the number of persons present in the air-conditioning target space.

11. An air-conditioning control method comprising:
comparing a first operating efficiency, which is an operating efficiency when only first air conditioning is performed, with a second operating efficiency, which is an operating efficiency when only second air conditioning is performed,
wherein the first air conditioning is air conditioning that cools an air-conditioning target space to a set temperature by operation of an indoor unit of an air conditioner, and
wherein the second air conditioning is an air conditioning that cools the air-conditioning target space to the set temperature, without operating the indoor unit, by operating a ventilator to supply outdoor air without adjusting a temperature of the supplied outdoor air, the non-temperature-adjusted outdoor air being supplied in sufficient quantity to cool the air-conditioning target space to the set temperature;
deciding whether to perform the first air conditioning and whether to perform the second air conditioning, based on a result of comparison between the first operating efficiency and the second operating efficiency; and
controlling the indoor unit and the ventilator to cause one of the first air conditioning and the second air conditioning to be performed based on the decision.

12. A non-transitory computer readable medium storing an air-conditioning control program which, when executed, causes a computer to perform:
a comparison process of comparing a first operating efficiency, which is an operating efficiency when only first air conditioning is performed, with a second operating efficiency, which is an operating efficiency when only second air conditioning is performed,
wherein the first air conditioning is air conditioning that cools an air-conditioning target space to a set temperature by operation of an indoor unit of an air conditioner, and
the second air conditioning being is air conditioning that cools the air-conditioning target space to the set temperature, without operating the indoor unit, by operating a ventilator to supply outdoor air without adjusting a temperature of the supplied outdoor air, the non-temperature-adjusted outdoor air being supplied in sufficient quantity to cool the air-conditioning target space to the set temperature;
a decision process of deciding whether to perform the first air conditioning and whether to perform the second air conditioning, based on a result of comparison between the first operating efficiency and the second operating efficiency by the comparison process; and
a control process of controlling the indoor unit and the ventilator to cause one of the first air conditioning and the second air conditioning to be performed based on the decision.

* * * * *